March 1, 1927.
J. GAGL
1,619,715
PHOTOGRAPHIC APPARATUS TO IDENTIFY HOLDUP MEN
Filed April 14, 1925
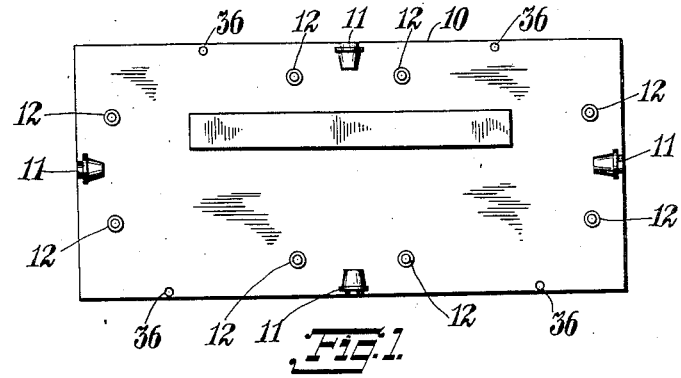
Fig. 1.
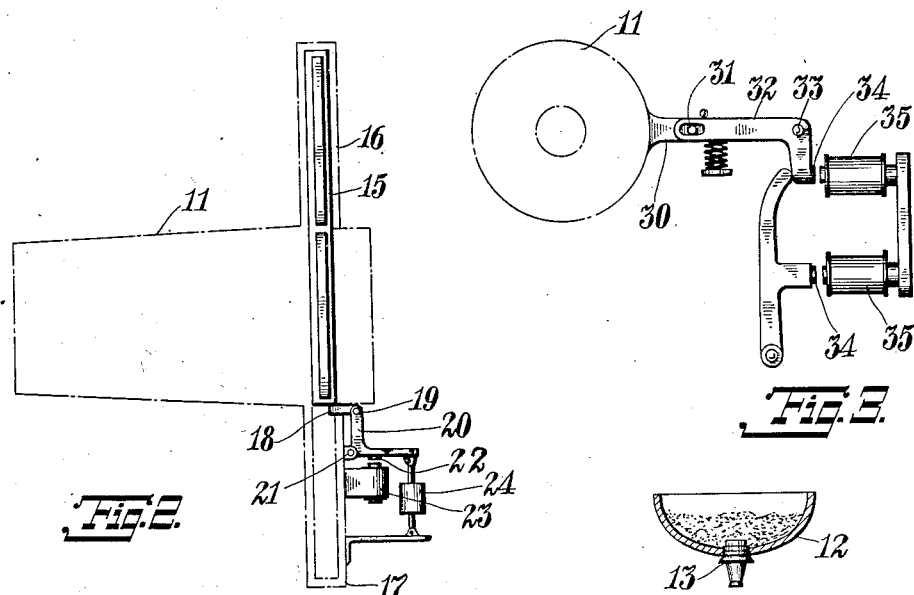
Fig. 2.
Fig. 3.
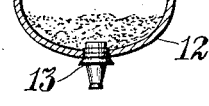
Fig. 4.
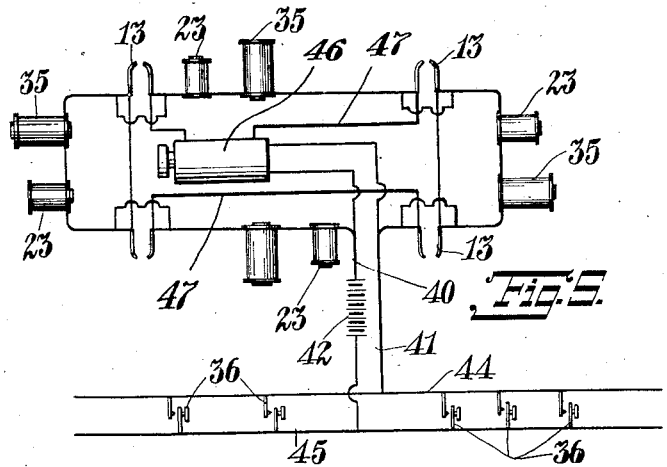
Fig. 5.
INVENTOR
John Gagl
BY
ATTORNEY Patented Mar. 1, 1927.

1,619,715

UNITED STATES PATENT OFFICE.

JOHN GAGL, OF BRONX, NEW YORK.

PHOTOGRAPHIC APPARATUS TO IDENTIFY HOLDUP MEN.

Application filed April 14, 1925. Serial No. 22,949.

This invention relates generally to a photographic apparatus whereby photographs may be taken of anyone endeavoring to rob a store, bank or the like in the presence of the clerks by threatening the latter, this sort of robbery being known generally as a hold-up.

The invention has for a general object the provision of a novel device for the above purpose, a further specific object relating to the provision of means for taking successive photographs.

For further comprehension of the invention, and of the objects and advantages thereof, reference will be had to the following description and accompanying drawing and to the appended claims in which the various novel features of the invention are more particularly set forth.

Fig. 1 of the drawing is a diagrammatical view indicating the arrangement of the apparatus in a store.

Fig. 2 is a side elevational view showing one of the cameras with its drop slide.

Fig. 3 is a detail face view of the camera showing particularly the means for throwing the shutter.

Fig. 4 is a vertical sectional view of one of the receptacles for the flashlight powder.

Fig. 5 is a partial diagram of the wiring connections.

In Fig. 1 of the drawing the lines 10 indicate the walls of a store, such as a jewelry store, although it is to be understood that I do not limit the application of the invention to any particular business structure. Upon each of the walls of the store I mount a camera 11 which faces toward the centre of the store and is placed at a suitable height. While I have indicated the camera in Fig. 2 as arranged with its focal axis horizontal it is to be understood that if it is desired to mount the camera near the ceiling of the room the said axis may be slightly inclined. Suitably placed, one on each side of each camera, are saucerlike receptacles 12 which have placed therein a flashlight powder of the usual type. Fixed in the bottom of each of these receptacles is a sparkplug 13 of ordinary construction which is used to ignite the powder in the receptacle.

The cameras 11 are in the main of ordinary construction except that each is adapted to accommodate a double length plate holder 15 which carries two plates. This holder is inserted in the camera with its main length extending vertically, that is with one plate above the other, while the cameras formed with upwardly and downwardly projected flat chambered elements 16 and 17 which accommodate the plate holder. The latter is first inserted in the camera in the position indicated in Fig. 2, with the lower plate ready for exposure and the upper plate located in the element 16, the holder being retained against dropping by means of a bolt 18 which projects through the wall of the element 17 under the plate holder and has connected to its outer end by a slot and pin connection 19, one arm of a bell crank lever 20 fulcrumed as at 21 on the element 17 and having the armature 22 of an electromagnet 23 fixed on its other arm, this electromagnet being mounted on the wall of the element 17. Movement of the lever 20 under the influence of the magnet is retarded by means of a dashpot 24.

The shutter of the camera may be operated by means of the ordinary arm 30 which is connected, by a slot and pin connection 31 with the main arm of a T-lever 32 which is fulcrumed as at 33 upon a suitable projection from the camera 11 or its support and has the armatures 34 of a pair of electro-magnets 35 mounted on the ends of the cross arm, so that by successive energizing of the respective magnets the shutter can be thrown successive times to expose the two plates carried by the camera. The circuit through the various magnets and the sparkplugs are adapted to be closed by any one of a number of switches 36 suitably placed around the store.

In Fig. 5 I have shown the electrical connections by means of which the first picture is taken. A pair of wires 40 and 41, one of which is connected through a battery 42 or other source of electric current lead in series through the plate holder releasing magnets 23 one of each of the pair of magnets 35 for throwing the shutter. These wires are connected respectively to another pair of wires 44 and 45 across which the switches are bridged in parallel. As will be apparent, when one of the switches 36 is closed the shutter of each camera will be thrown.

For the purpose of developing sufficient voltage to jump the gap of the spark plugs 13, I have provided a vibrator transformer 46, of ordinary construction such as employed in auto ignition systems. The vibrator and primary coil of the transformer 46 are connected in series with the magnets 23 and in parallel with the switches 36. Leads 47 from the secondary coil connect the plugs 13 in series with each other so that when one of the switches 36 is closed the primary coil and vibrator of the transformer will be excited causing a high tension current to jump across the gaps of the spark plugs 13. This spark will then ignite the flashlight powder. The electro-magnet 23 of each camera will also be energized, but since the movement of the lever 20 is retarded by the dashpot 24 the release of the bolt 18 will be delayed sufficiently to expose the lower plate, after which the holder 15 drops to its lower position with the upper plate in a position to be exposed. The second exposure may be affected by pressing one of another series of switches, the connections being a duplicate of that shown in Fig. 5 except that the connections to the magnets may be eliminated.

Having thus described my invention what I claim as new and desire to protect by Letters Patent of the United States is as follows:

1. In a device of the class described, a camera arranged to accommodate a vertically shiftable plate holder adapted to carry a pair of plates, a bolt holding said plate holder in raised position, a receptacle for a flashlight powder, a sparkplug therein, a shutter-operating lever, an electro-magnet for moving said lever in one direction, an electro-magnet for releasing said bolt, and a switch controlling said electro-magnets and sparkplug.

2. In a device of the class described, a camera arranged to accommodate a vertically shiftable plate holder adapted to carry a pair of plates, a bolt holding said plate holder in raised position, a receptacle for a flashlight powder, a sparkplug therein, a shutter-operating lever, an electro-magnet for moving said lever in one direction, an electro-magnet for releasing said bolt, and a switch controlling said electro-magnets and sparkplug, and a dashpot connected with said bolt releasing magnet for retarding the release of the bolt.

3. In a device of the class described, a camera arranged to accommodate a vertically shiftable plate holder adapted to carry a pair of plates, a bolt holding said plate holder to raised position, a receptacle for a flashlight powder, a sparkplug therein, a shutter-operating lever, an electro-magnet for moving said lever in one direction, an electro-magnet for releasing said bolt, and a switch controlling said electro-magnets and sparkplug, and a second electro-magnet for moving said lever in an opposite direction.

In testimony whereof I have affixed my signature.

JOHN GAGL.